(12) United States Patent
Katada et al.

(10) Patent No.: US 6,344,941 B1
(45) Date of Patent: Feb. 5, 2002

(54) MAGNETIC TAPE UNIT

(75) Inventors: Masahiko Katada; Yoshinori Nagai, both of Hyogo (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/704,949

(22) Filed: Nov. 2, 2000

(30) Foreign Application Priority Data

Mar. 29, 2000 (JP) ........................................ 2000-091384

(51) Int. Cl.[7] .......................... G11B 5/09; G11B 21/04; G11B 15/46
(52) U.S. Cl. ..................... 360/51; 360/70; 360/73.04
(58) Field of Search ................. 360/51, 73.04, 360/46, 70

(56) References Cited

U.S. PATENT DOCUMENTS 5,057,949 A * 10/1991 Suga et al. ............... 360/77.16
5,235,422 A * 8/1993 Ido et al. .................... 348/537
5,408,366 A * 4/1995 Bentley et al. ............... 360/53

FOREIGN PATENT DOCUMENTS

| JP | 02107079 A | 4/1990 |
| JP | 05-101355 | 3/1993 |
| JP | 07078320 A | 3/1995 |

* cited by examiner

Primary Examiner—Regina Y. Neal
(74) Attorney, Agent, or Firm—Greer, Burns & Crain, Ltd.

(57) ABSTRACT

A magnetic tape unit includes a magnetic tape, a magnetic head, a phase-locked loop (PLL) and a desynchronized track detector. The magnetic tape is provided with a plurality of tracks. The magnetic head is arranged to simultaneously read out data from the tracks on the tape. The PLL is arranged to perform bit synchronization of data read out from each of the tracks on the tape. The detector is arranged to detect a desynchronized track by comparing transmission speeds of data read out from the respective tracks on the tape.

8 Claims, 11 Drawing Sheets

FIG.5

FSC1 001001000010010101001010
FSC2 001000101010000101010100
FSC3 001010010100100100100100
FSC4 001010100101001000010100
FSC5 001010000101010010100100

BSC1 010100101010010000100100
BSC2 001010101000010101000100
BSC3 001001001001001010010100
BSC4 001010000100101001010100
BSC5 001001010010101000010100

FRC 010101010010101010100100

BRC 001001010101010010101010

FIG.8

| EFFECTIVE TR. | 16 | 15 | 14 | 13 | 12 | 11 | 10 | 9 | 8 | 7 | 6 | 5 | 4 | 3 |
|---|---|---|---|---|---|---|---|---|---|---|---|---|---|---|
| TR. NUM. THRESHOLD | 9 | 8 | 8 | 7 | 7 | 6 | 6 | 5 | 5 | 4 | 4 | 3 | 3 | 2 |

MAGNETIC TAPE UNIT

BACKGROUND OF THE INVENTION

1. Field of the Invention

The present invention relates to a magnetic tape unit of the type which is provided with a read/write head designed to simultaneously access a plurality of tracks on a magnetic tape and with a phase-locked loop (PLL) for subjecting the read-out data to bit synchronization.

2. Description of the Related Art

An example of conventional magnetic tape unit is shown in FIG. 12 of the accompanying drawings. The conventional unit, as illustrated, includes a magnetic read/write head 51, a read/write circuit 52, a PLL 53 and a data formatter 54. The magnetic head 51 reads out data from a magnetic tape and supplies it to the read/write circuit 52. The read/write circuit 52 demodulates the received data and supplies it to the PLL 53 in which the data is subjected to bit synchronization. The bit-synchronized data is then sent to the data formatter 54. The data formatter 54 performs the detection of data format, while also being responsible for data transmission.

The conventional magnetic tape unit has been found disadvantageous in the following point.

Specifically, in the conventional unit, the bit synchronization by the PLL 53 may fail to be performed properly due to unfavorable conditions, such as wear of the magnetic tape or magnetic head 51, adhesion of particulate matter to the head 51, etc. In such an instance, the data transmission speed may vary unacceptably. The conventional tape unit, however, is not provided with any means to detect such abnormal data transmission, and continues to send the data. Thus, disadvantageously, an error will be contained in the read-out data.

SUMMARY OF THE INVENTION

The present invention has been proposed under the above-described circumstances, and its object is to provide a magnetic tape unit capable of promptly detecting the failure in performing bit synchronization.

According to a first aspect of the present invention, there is provided a magnetic tape unit which includes a magnetic tape provided with a plurality of tracks, a magnetic head arranged to simultaneously read out data from the tracks on the tape, a phase-locked loop (PLL) arranged to perform bit synchronization of data read out from each of the tracks on the tape, and a detector arranged to detect a desynchronized track by comparing transmission speeds of data read out from the respective tracks on the tape.

Preferably, each of the tracks on the tape may be provided with a unit data region flanked by synchronization codes to perform byte synchronization. The detector may be arranged to compare the transmission speeds with each other during a period for reading out data from the unit data region.

Preferably, the detector may compare any one of the transmission speeds with remaining transmission speeds, so that failure in bit synchronization is determined by majority rule.

Preferably, the magnetic tape unit of the present invention may further include a timer and a desynchronized track recognizer. The timer may start measuring time when a first piece of particular data is detected in the read-out data from a predetermined number of tracks. The desynchronized track recognizer may be arranged to regard a particular track as a bit-desynchronized track when a second piece of particular data is not detected in the read-out data from said particular track within a predetermined time period after the timer is started.

Preferably, each of the tracks on the tape may be provided with burst pattern regions for performing bit synchronization.

Preferably, the magnetic tape unit of the present invention may further include a burst pattern region detector for detecting the burst pattern regions of each track based on the read-out data from said each track.

Further, the magnetic tape unit may include a bit synchronization instructor for supplying an instruction to cause the PLL to perform bit synchronization with respect to a desynchronized track when a burst pattern region is detected by the burst pattern region detector.

Still further, the magnetic tape unit may include a pseudo-data generator arranged to supply to the PLL a piece of pseudo-data for performing bit synchronization with respect to a desynchronized track.

Other features and advantages of the present invention will become apparent from the detailed description given below with reference to the accompanying drawings.

BRIEF DESCRIPTION OF THE DRAWINGS

FIG. 5 shows the contents of FSCs, BSCs, FRC and BRC;

FIG. 8 is a table showing the relation between the number of effective tracks and the track number thresholds;

DETAILED DESCRIPTION OF THE PREFERRED EMBODIMENTS

The preferred embodiments of the present invention will be described below with reference to the accompanying drawings.

Figure 1:
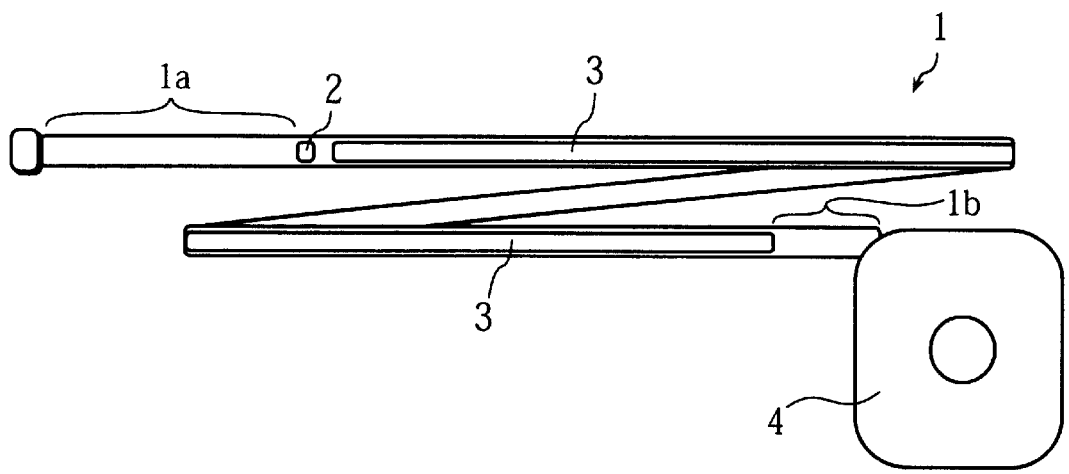
FIG. 1 illustrates the format of a magnetic tape used for a magnetic tape unit of the present invention.

Reference is first made to FIG. 1 illustrating a magnetic tape 1 used for a magnetic tape unit of the present invention. Normally, the tape 1 is accommodated in a housing case 4. As illustrated, the tape 1 is provided with a head portion 1a, a tail portion 1b, a drive region 2 and a data region 3.

The head portion 1a and the tail portion 1b are data-free regions where no data is stored. The drive region 2, arranged adjacent to the head portion 1a, is used to store the use history of the tape 1, information about defections of the tape 1, etc. The drive region 2 is accessed when the tape 1 is loaded onto and unloaded from the tape unit. The data region 3 extends between the drive region 2 and the data-free tail portion 1b. Though not shown in FIG. 1, a total of 16 user data tracks, separate from each other widthwise of the tape 1, are provided in the data region 3.

Figure 2:
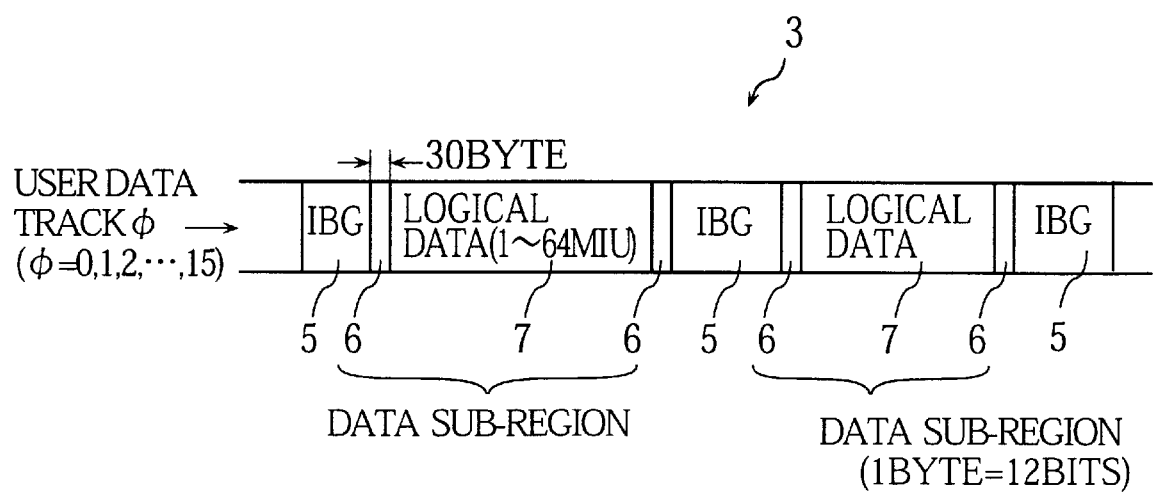
FIG. 2 illustrates the format of the data region of the tape of FIG. 1.

FIG. 2 illustrates the format of the above-mentioned user data tracks of the data region 3. As shown, each user data track is provided with a plurality of data sub-regions which are arranged in the longitudinal direction of the tape 1. Each of the sub-regions includes two burst regions 6 and a logical data block 7 flanked by these burst regions. The respective data sub-regions are separated from each other by IBGs 5.

The IBG region 5 stores an IBG pattern consisting of repetitions of a piece of data such as "100000000." The IBG region 5 serves as an inter-block gap to separate the successive data sub-regions, as mentioned above. The IBG pattern may consist of repetitions of a different piece of data other than "100000000", if there is no such data used in the RLL (run length limited) encoding system. As viewed in the longitudinal direction of the tape 1, the IBG region 5 may have a length of 2 mm.

The burst region 6 stores 30-byte (360-bit) data consisting of repetitions of a pattern "10" to perform the bit synchronization. It should be noted here that in this specification, one byte is equal to 12 bits.

Figure 3:
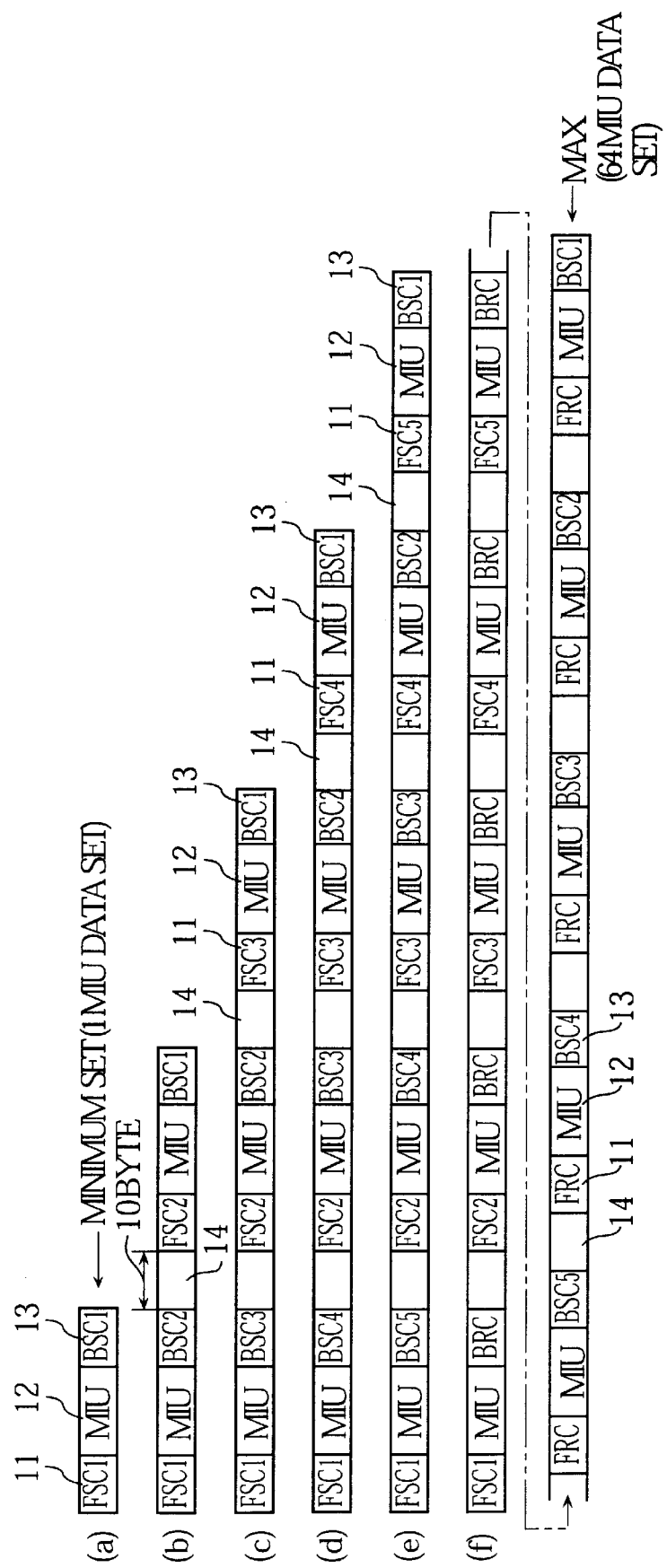
FIG. 3 illustrates the format of a logical data block shown in FIG. 2.

FIG. 3 illustrates the format of the logical data block 7 shown in FIG. 2. The logical data block 7 may contain at least one and at most 64 minimum data set. A minimum data set (see (a) in the figure) is made up of a forward synchronization code section 11, a data unit section 12 and a reverse synchronization code section 13.

When the logical data block 7 contains two or more minimum data sets (see (b)–(f) in FIG. 3), a re-synchronization burst section 14 is disposed between the successive minimum data sets.

In the preferred embodiment, six forward synchronization codes (FSC1–FSC5 and FRC) and six reverse synchronization codes (BSC1–BSC5 and BRC) are used. As shown in FIG. 3, each forward synchronization code section 11 stores one of the six forward synchronization codes (FSC1–FSC5 and FRC), while each reverse synchronization code section 13 stores one of the six reverse synchronization codes (BSC1–BSC5 and BRC).

When the logical data block 7 contains five minimum data sets (see (e) in FIG. 3), the forward synchronization codes FSC1–FSC5 are stored, in this order, in the first through the fifth forward synchronization code sections 11, respectively. On the other hand, the reverse synchronization codes BSC5–BSC1 are stored, in this order, in the first through the fifth reverse synchronization code sections 13, respectively.

When the logical data block 7 contains six or more minimum data sets (see (f) in FIG. 3), the first five forward synchronization code sections 11 hold the forward synchronization codes FSC1–FSC5, whereas the sixth and latter forward synchronization code sections 11 hold the sixth forward synchronization code FRC. On the other hand, the last five reverse synchronization code sections 13 hold the reverse synchronization codes BSC5–BSC1, whereas the other reverse synchronization code sections 13 hold the reverse synchronization code BRC.

In operation, the sixth forward synchronization code FRC and the other five forward synchronization codes FSC1–FSC5 serve for the same purpose, so do the sixth reverse synchronization code BRC and the other five reverse synchronization codes BSC5–BSC1. These forward or reverse synchronization codes FSC1–FSC5, FRC, BSC5–BSC1 and BRC are patterns disposed on the boundaries of data for performing byte synchronization.

The re-synchronization burst section 14 stores 10-byte (120-bit) data consisting of repetitions of a pattern "10" for performing bit re-synchronization.

Figure 4:
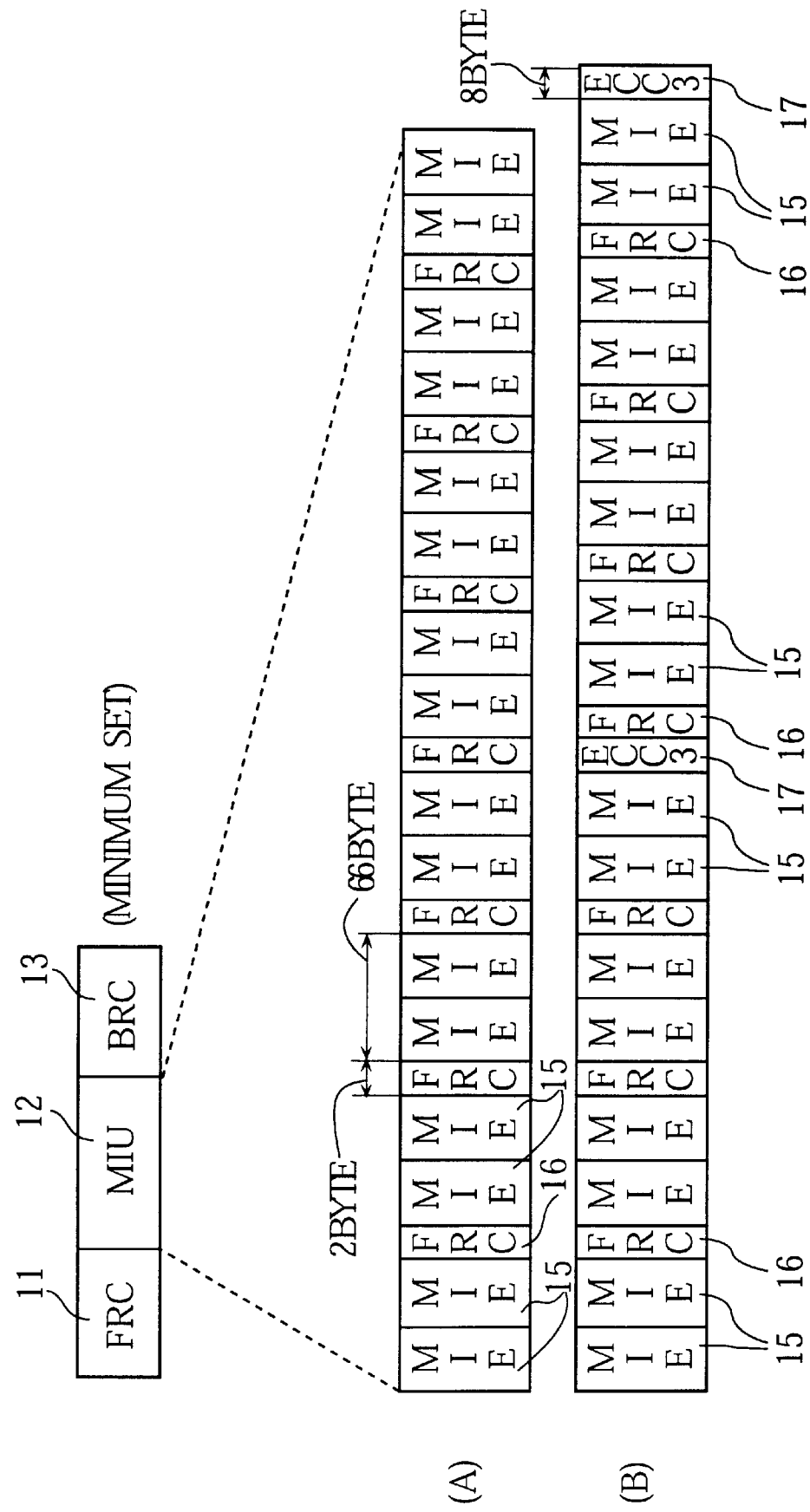
FIG. 4 illustrates the format of an MIU shown in FIG. 3.

FIG. 4 illustrates the format of each data unit section 12 shown in FIG. 3. The upper format (A) shows an example with no error correction code ECC3 stored, while the lower format (B) shows an example with error correction codes ECC3 recorded additionally.

The upper format (A) includes repetitions of a pair of adjacent data areas 15 arranged in the longitudinal direction of the magnetic tape. Each of the data areas 15 stores 33-byte (396-bit) data which includes error correction codes ECC1 and ECC2. The format (A) also includes a plurality of synchronization code areas 16 each of which is disposed between two successive pairs of data areas 15. Each synchronization code area 16 stores a forward resynchronization code FRC.

The lower format (B) is identical to the upper format (A) except for the dispersively inserted areas 17 of the error correction codes ECC3. As shown in FIG. 4, each of these additional areas 17 is placed immediately after every four successive pairs of data areas 15. Each error correction code ECC3 is 8-byte (96-bit) data.

FIG. 5 shows the contents of the above-mentioned codes FSC1–FSC5, BSC1–BSC5, FRC and BRC. Each of these codes is 2-byte (24-bit) data.

Figure 6:
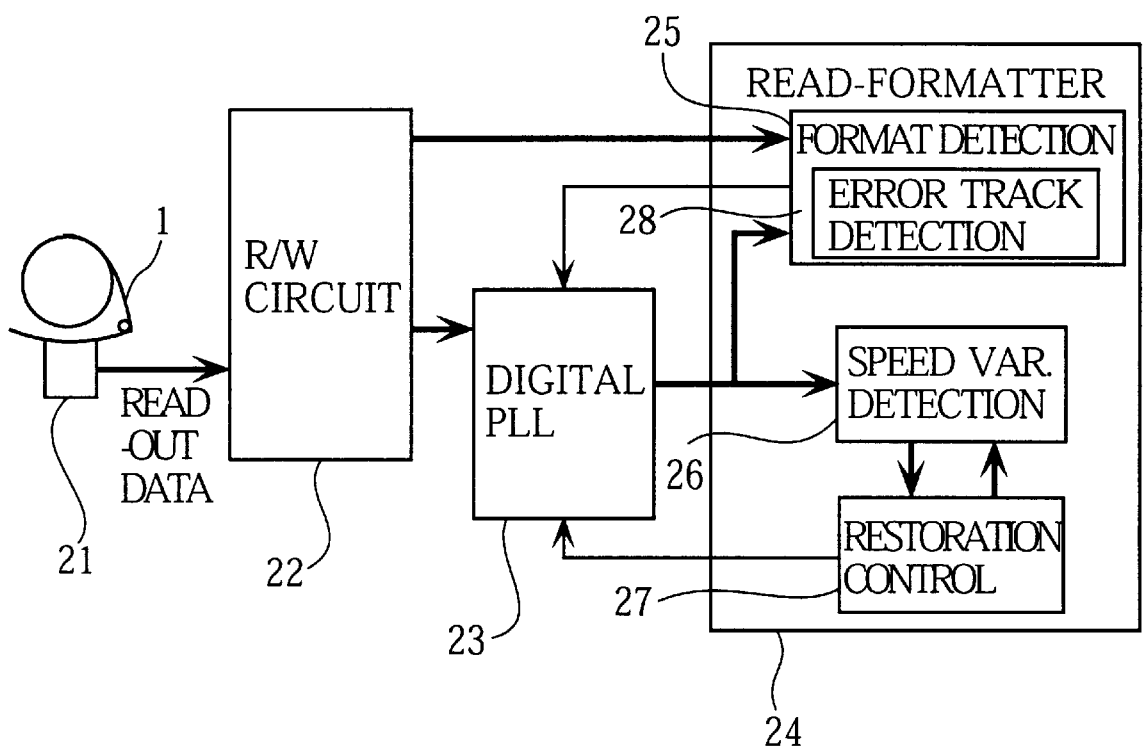
FIG. 6 is a block diagram showing the principal components of the magnetic tape unit of the present invention.

FIG. 6 is a block diagram showing the principal components of the magnetic tape unit of the present invention. As illustrated, the tape unit includes a magnetic head 21, a read/write circuit 22, a digital PLL (phase-locked loop) 23 and a read-formatter 24. The read-formatter 24 is provided with a format detection circuit 25, a speed variation detection circuit 26 and a restoration control circuit 27. The format detection circuit 25 includes an error track detection circuit 28.

The magnetic head 21 is arranged to access the above-described magnetic tape 1 for performing data-reading and data-writing with respect to the user data tracks on the tape 1. To this end, the head 21 is provided with a plurality of data-reading head elements and a plurality of data-writing head elements.

The read/write circuit 22 demodulates signals read out by the head 21 from the tracks of the tape 1. Specifically, the read/write circuit 22 converts the analog signal read out from each track into digital data.

The digital PLL 23 receives each piece of converted digital data (obtained from a relevant one of the tracks on the tape 1) and subjects this received data to bit synchronization.

In general, the read-formatter 24 detects the data format of the read-out data supplied from the read/write circuit 22, and further transmits the received read-out data to an external circuit. This data transmission is performed one byte after another. The read-formatter 24 also monitors the transmission speed of the read-out data supplied from the PLL 23. Upon finding that a piece of data is out of bit synchronization, the read-formatter 24 identifies the particular track from which this desynchronized data has been obtained. Then, the read-formatter 24 causes the PLL 23 to perform the necessary bit synchronization to the ill-behaved data.

More specifically, the above-mentioned data format detection is performed by the format detection circuit 25 of the read-formatter 24. The speed variation detection circuit 26 determines whether or not the transmission speed of the read-out data from the PLL 23 is normal.

The restoration control circuit 27, based on the determination of the speed variation detection circuit 26, causes the PLL 23 to subject the read-out data having an improper transmission speed to bit synchronization.

The error track detection circuit 28 determines, in a different manner from that of the speed variation detection circuit 26, whether or not the transmission speed of the read-out data from the PLL 23 is normal. This error determination is performed with respect to every relevant track on the magnetic tape.

Figure 7:
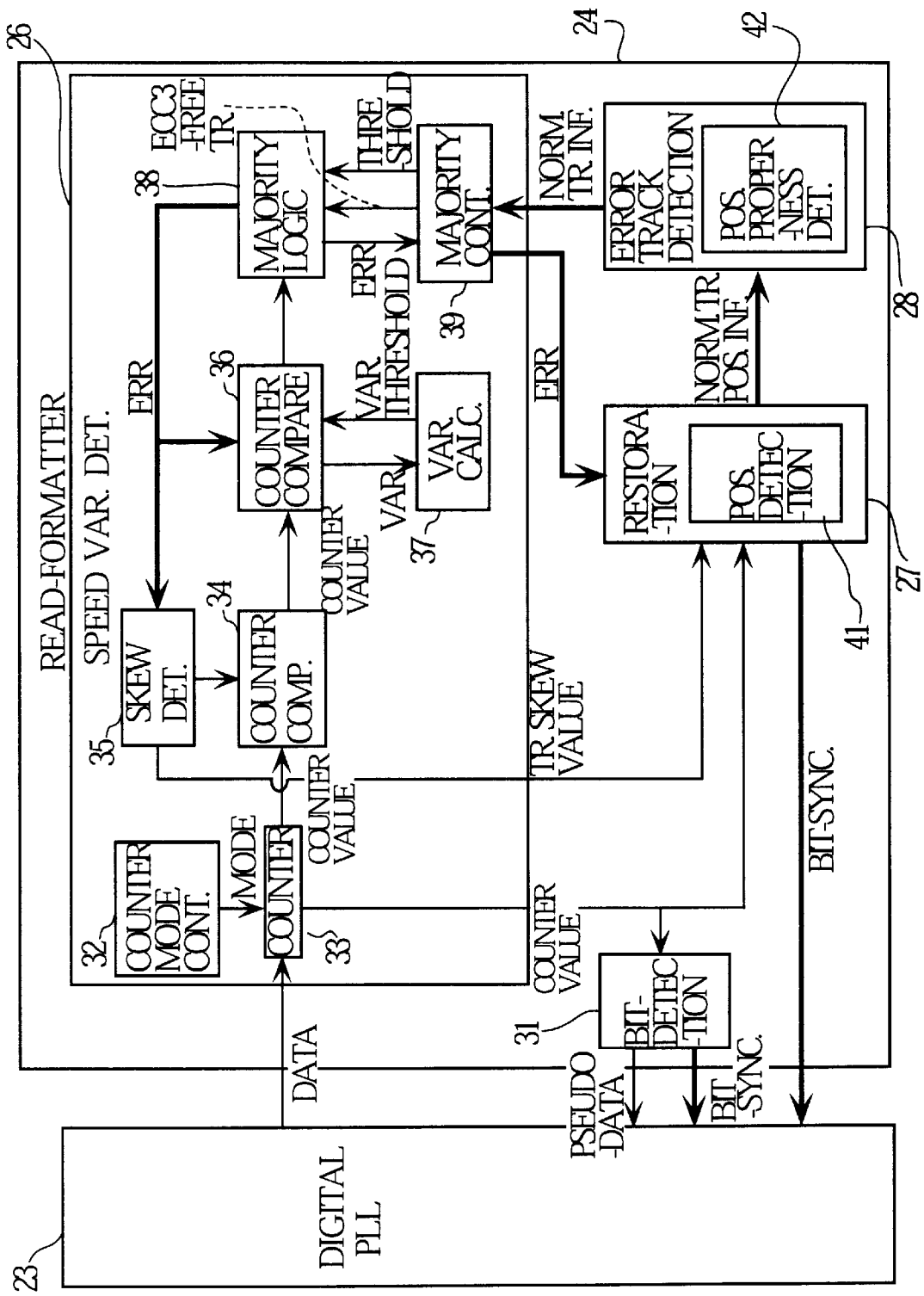
FIG. 7 is a block diagram showing the principal elements of the read-formatter shown in FIG. 6.

FIG. 7 is a detailed block diagram showing the principal components of the read-formatter 24 shown in FIG. 6. The read-formatter 24 is provided with a bit detection circuit 31. The speed variation detection circuit 26 is provided with a counter mode controller 32, a data input counter 33, a counter compensation circuit 34, a skew detection circuit 35, a counter comparison circuit 36, a variation calculation circuit 37, a majority decision logic circuit 38 and a majority logic control circuit 39. The restoration control circuit 27 is provided with a position detection circuit 41. The error track detection circuit 28 is provided with a position properness determination circuit 42.

The bit detection circuit 31 determines the input condition of every bit of data with respect to the respective tracks, based on the count number supplied from the data input counter 33. While performing such determination, the bit detection circuit 31 will supply a pseudo-burst pattern to the PLL 23 with proper timing, thereby causing the PLL to perform a bit-synchronizing operation. This arrangement is advantageous when the position detection circuit 41 fails to provide accurate positional information.

The counter mode controller 32 controls the data input counter 33, so that the speed variation detection is performed with every data unit section 12 (FIG. 3).

Under the control of the counter mode controller 32, the data input counter 33 counts the bit number of the data which is read out from the data unit sections 12 and supplied from the PLL 23.

The counter compensation circuit 34 compensates the counter number at the data input counter 33 (with respect to the respective tracks) based on the skew values detected by the skew detection circuit 35.

For instance, it is supposed that the skew values of the track0, track1 and track2 are 10, 5 and 0, respectively, and that the counter numbers at the data input counter 33 are 30, 25 and 20 for the track0, track1 and track2, respectively. In such an instance, the counter compensation circuit 34 compensates these counter numbers in the following manner.

Track0→30−10=20
Track1→25−5=20
Track2→20−0=20

Such compensation is necessary because the detected counter numbers corresponding the respective tracks may be different from each other due to the skew of the magnetic tape 1. (Such a skew-caused difference will be observed even if the transmission speed of the read-out data is normal.) Here, the "skew value" is the difference between the actually detected bit number of the read-out data and the normal bit number which should be detected when no skew occurs.

The counter comparison circuit 36 compares the thus compensated counter numbers. In performing this comparison, use is made of a variation threshold supplied from the variation calculation circuit 37.

Specifically, the variation calculation circuit 37 calculates the mean value of the variations of the data transmission speeds of the read-out data corresponding to the normal tracks. Then, the circuit 37 supplies the calculated mean value×3 (variation threshold) to the counter comparison circuit 36. According to the present invention, the number multiplied by the mean value may be an integer other than 3.

The majority decision logic circuit 38 detects an abnormal track based on the comparison at the counter comparison circuit 36. To this end, use is made of a threshold supplied from the majority logic control circuit 39.

For instance, it is now supposed that two tracks (out of all the 16 tracks) are found abnormal (that is, the data transmission speed with respect to these two tracks is abnormal) by the error track detection circuit 28. Then, the number of effective tracks is 14 (=16−2). Referring now to the table of FIG. 8, the track number threshold corresponding to 14 effective tracks is 8. Thus, if the speed variation detection circuit 26 have determined that eight or more tracks are normal (this normality decision is "tentative" one), these eight or more tracks are recognized as "truly" normal tracks. On the other hand, if there are 7 (=14−8+1) or more tracks which are "tentatively" abnormal, these tracks will be regarded as "truly" abnormal tracks (or error tracks). When there are only two or fewer tracks, the majority rule cannot be applied. In this case, the speed variation detection is invalid.

The position detection circuit 41 detects a data reading position on the tape 1 based on the counter number from the counter 33 and the skew value from the skew detection circuit 35. At this time, reference is made to the results of the error track detection by the majority logic control circuit 39. When it is a normal track, the required positional information is obtained from the counter number of the counter 33 for the normal track itself. On the other hand, when it is an abnormal track, the required positional information is obtained from the counter number of the counter 33 for the normal track which is adjacent to the abnormal track.

As stated above, the correct positional information is acquired by the position detection circuit 41. Thus, it is possible to restore the detected abnormal track to the normal condition quickly by causing the PLL 23 to perform bit synchronization at the re-synchronization burst section 14.

When the forward synchronization code sections 11 of a predetermined number of tracks are detected, the position properness determination circuit 42 determines that the data read position is at the forward synchronization code sections 11. On the other hand, when the reverse synchronization code sections 13 of a predetermined number of tracks are detected, the position properness determination circuit 42 determines that the data read position is at the reverse synchronization code sections 13.

Incorporating the above-described components, generally the magnetic tape unit of the present invention operates in the following manner.

First, data recorded on the magnetic tape 1 is read out by the magnetic head 21. To this end, the magnetic head 21 is provided with a plurality of data-reading head elements. Each of these elements corresponds to a relevant one of the tracks on the tape 1. This means that the magnetic head 21 can simultaneously read out data from the same number of tracks on the tape 1 as the data-reading head elements.

Then, the analog data read out by the head 21 is supplied to the read/write circuit 22 to be converted into digital data. This digital data is inputted to the digital PLL 23 for bit synchronization. Then, the bit-synchronized digital data is sent to the read-formatter 24 to be subjected to format detection.

When the bit synchronization at the PLL 23 fails, the transmission speed of the data becomes abnormal. This is unfavorable because the read-out data thereafter becomes erroneous per block or per track. To deal with this problem, the transmission speeds of the read-out data from the respective tracks should be monitored so as to detect abnormality as soon as possible. Through this data transmission monitoring operation, abnormal tracks are identified by the majority decision logic based on the number of normal tracks. When the majority decision logic is not applicable, the abnormality of the transmission speed is detected e.g. by monitoring the forward synchronization code section 11 (except the FSC1) with the use of a timer. After an error track is detected, the bit synchronization is performed by the burst pattern of the re-synchronization burst section 14. When the restoration attempt by the section 14 has failed, the bit detection circuit 31 supplies pseudo-data (burst pattern identical to that of the re-synchronization burst section 14) to the PLL 23 to perform bit synchronization for required restoration.

Figure 9:
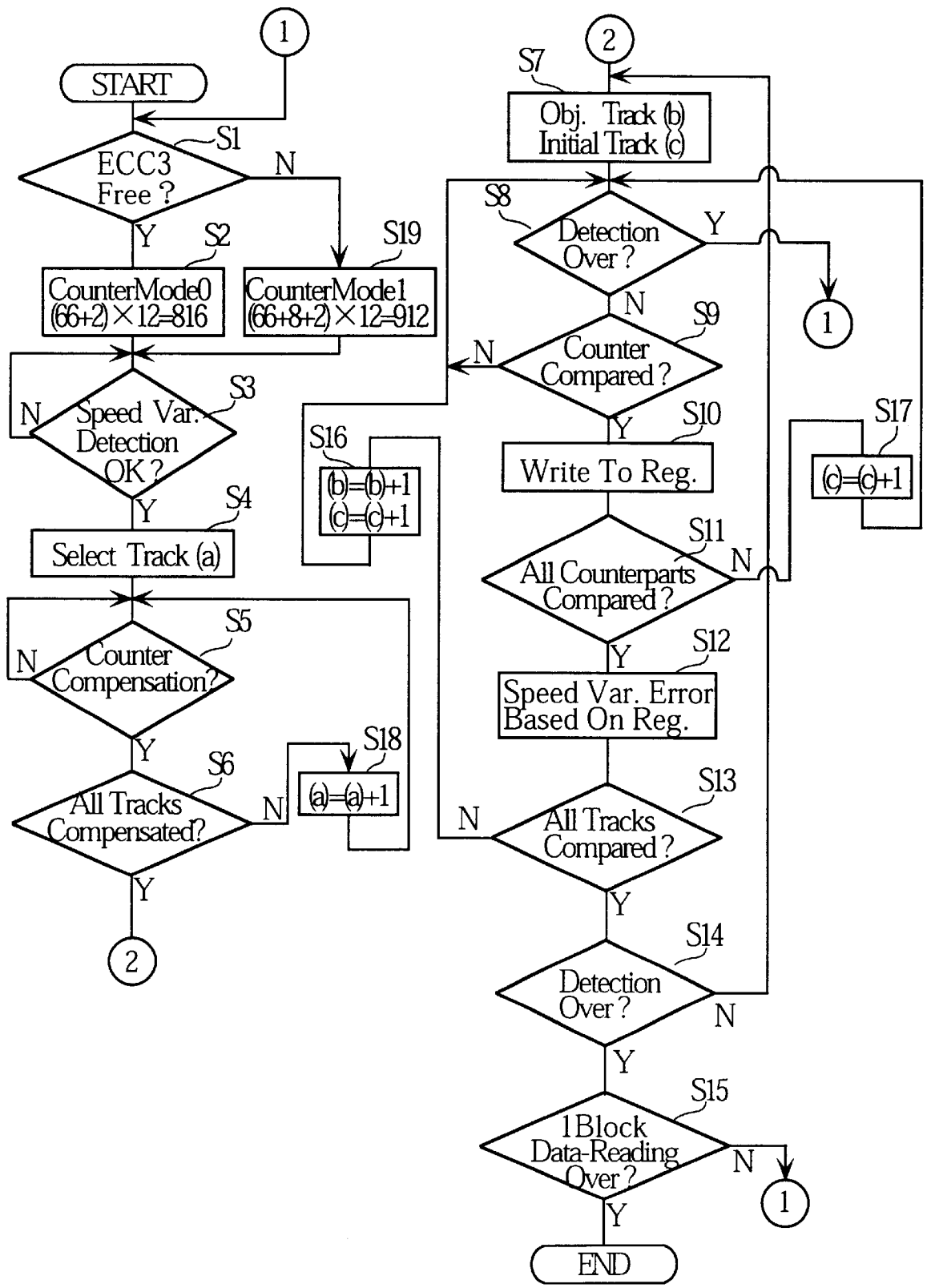
FIG. 9 is a flowchart illustrating how the speed variation detection proceeds.

Reference is now made to FIG. 9 which is a flow chart illustrating the speed variation detecting procedure of the magnetic tape unit of the present invention.

First, the read-formatter 24 determines whether or not the tape portion from which the magnetic head 21 is currently reading data is provided with an ECC3 (S1). The information about the presence or absence of an ECC3 is prerecorded at a predetermined position in the magnetic tape 1. When the current tape portion is provided with an ECC3 (S1:NO), the data input counter 33 begins to count up to 912, starting from a relevant synchronization code area 16 (FIG. 4). The maximum count number (912) corresponds to the total bit number of two MIE-data areas 15, one FRC code area 16 and one ECC3 area 17.

When it is an ECC3-free portion (S1:YES), the data input counter 33 begins to count up to 816, starting from a relevant synchronization code area 16 (FIG. 4). The maximum count number (816) corresponds to the total bit number of two MIE-data areas 15 and one FRC-code area 16.

Then, the speed variation detection circuit 26 determines whether or not the speed variation detection can begin (S3). Specifically, the circuit 26 determines whether or not the skew values for the respective tracks have been renewed. When no (S3:NO), the routine goes back to Step 3, to continue the preparation for the speed variation detection.

When the speed variation detection can be started (S3:YES), in other words, when the all of the skew values have been renewed, the counter compensation circuit 34 selects a track(a) and compensates the count number at the counter 33 for this selected track (S4). Here, "(a)" is a variable, and its initial value is 0.

Then, the speed variation detection circuit 26 determines whether or not the compensation of the counter number for the track(a) has been completed (S5).

When this compensation is completed (S5:YES), the speed variation detection circuit 26 determines whether or not the counter numbers of all of the tracks have been compensated (S6). When no (S6:NO), the counter comparison circuit 36 adds 1 to the variable (a) (S18), and the routine goes back to Step 5, to compensate the counter number of the next track.

When all of these counter numbers have been compensated (S6:YES), then the counter comparison circuit 36 will make a comparison among the count numbers for the respective tracks. To this end, the circuit 36 decides upon a reference track(b) and another track(c), which is the first track of the remaining tracks to be compared with the track(b) (S7). Here, "(b)" and "(c)" are variables, wherein the initial values of (b) and (c) are 0 and 1, respectively. Thus, the track0 is first compared with the track1.

Then, the speed variation detection circuit 26 determines whether or not the current data-reading operation for a speed variation detected portion has been over (S8). This speed variation detected portion is a data unit section (MIU) 12. When the current data unit section 12 has passed the magnetic head (S8:YES), the routine goes back to Step 1, to start the speed variation detection with the next data unit section 12.

When the data-reading operation for one data unit section 12 is still performed (S8:NO), it is determined whether or not the comparison between the count numbers of the track(b) [TrackO] and track(c) [Track1] has been completed (S9). When this comparison is not finished (S9:NO), the routine goes back to Step 8, to continue the count number comparison.

When the above comparison is completed (S9:YES), the counter comparison circuit 36 will store the result in an error track register (S10). Accurately, if the comparison provides a count number difference larger than the precalculated variation threshold, the track(c) [Track1] is stored as an error track in the register.

Further, the counter comparison circuit 36 determines whether or not the comparisons between the selected track (b) and all of the other tracks have been made (S11). Specifically, the circuit 36 determines whether or not Track0 has been compared with Track2, Track3, - - - , Track15. To this end, when the comparison between the track(b) and all of the other remaining tracks is not completed (S11:NO), the counter comparison circuit 36 adds 1 to the variable (c) (Step 17), and the routine goes back to Step 8, to continue the error track detection.

When all the comparisons have been completed (S11:YES), it is determined, by majority rule based on the error track information stored in the error track register, whether or not there is a speed variation error.

Then, the counter comparison circuit 36 determines whether or not each of the tracks0–15 has been compared with the other tracks (S13). When all of the count comparisons are not finished (S13:NO), the counter comparison circuit 36 adds 1 to the variables (b) and (c), respectively (S16), and the routine goes back to Step 8. Thus, the count number of the next selected track((b)+1) will be compared with the first track((c)+1) of the other remaining tracks, to continue the error track detection. It should be noted here that the new variables (b)+1 and (c)+1 are now regarded as (b) and (c), respectively, for the subsequent steps.

When all of these comparisons have been completed (S13:YES), the speed variation detection circuit 26 determines whether or not the data-reading operation with the current speed variation detected portion (or data unit section 12) has been completed (S14). When no (S14:NO), the routine goes back to Step 7, to continue the error track detection. When this data-reading operation has been completed (S14:YES), the speed variation detection circuit 26 further determines whether or not the data-reading operation with the current logical data block 7 (S15) is completed. When the data-reading operation for the one-data unit section is not finished (S14:NO), the routine goes back to Step 7, to continue the error track detection.

When the data-reading operation for the current data block 7 has been completed (S15:YES), the routine comes to an end. Thereafter, the same speed variation detection will be repeated with respect to each of the subsequent logical data blocks 7. When the one-block data-reading operation is not finished (S15:NO), the routine goes back to Step 1, to continue the speed variation detection.

Figure 10:
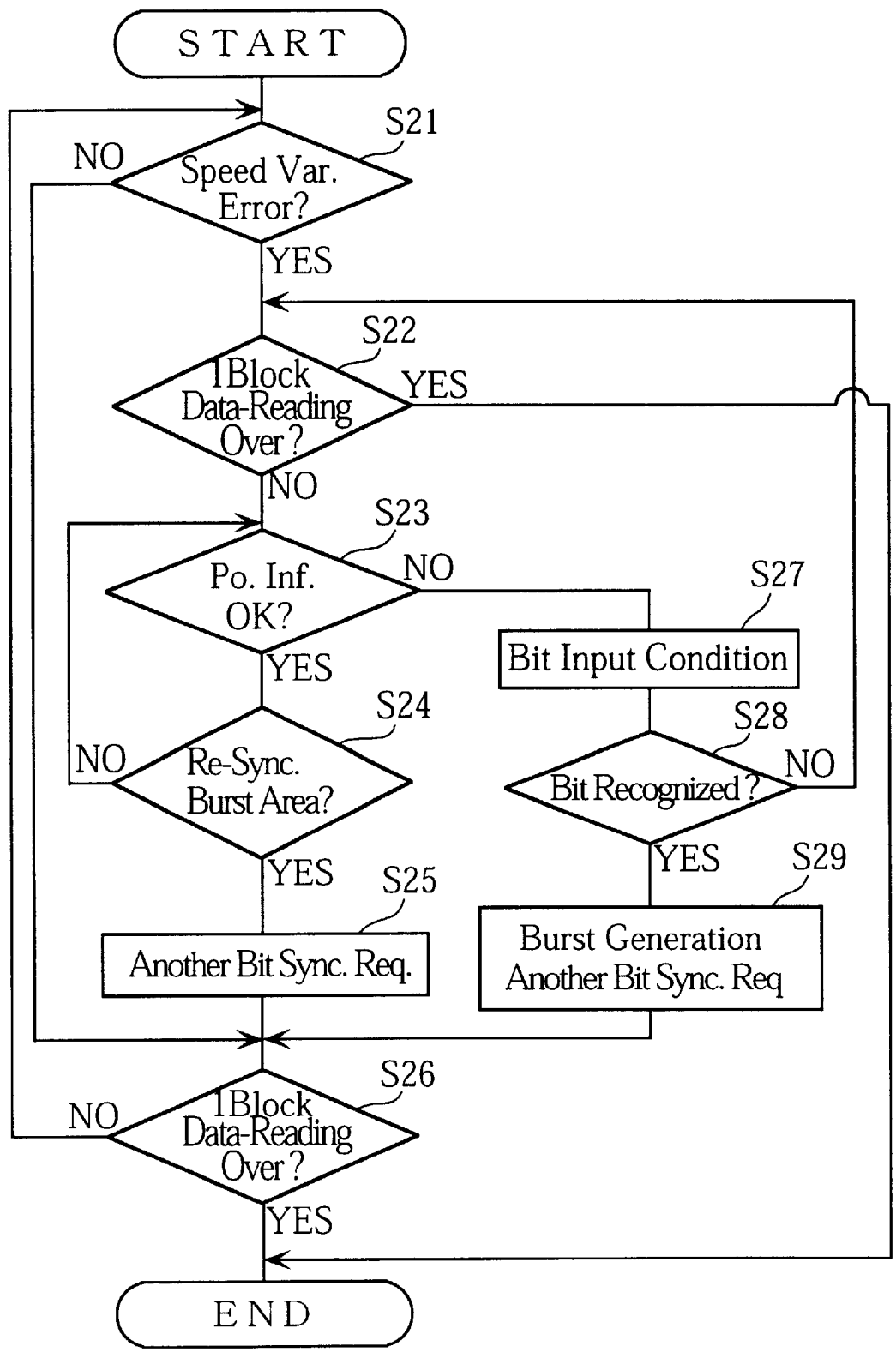
FIG. 10 is a flowchart illustrating how the bit-desynchronization restoration proceeds.

Reference is now made to FIG. 10 describe the restoration procedure for the bit de-synchronization in the magnetic tape unit.

First, the restoration control circuit 27 determines, based on the information from the majority logic control circuit 39, whether or not an error track is present (S21). When there is no error track (S21:NO), in other words, no speed variation error, then the routine goes to Step 26 since there is no need to perform a restoration procedure for bit de-synchronization.

When an error track is present (S21:YES), the restoration control circuit 27 determines whether or not the data-reading operation with one logical data block 7 is finished (S22).

When this data-reading operation is finished (S22:YES), the restoration procedure comes to an end.

When the above data block reading operation is not finished (S22:NO), the position detection circuit 41 determines whether or not the positional information contains an error (S23).

When the positional information contains no error (S23:YES), the restoration control circuit 27 determines whether or not the data-reading position with respect to the error track is at a re-synchronization burst section 14 (S24). When no (S24:NO), the routine goes back to Step 23.

When the above data-reading position is at a re-synchronization burst section 14 (S24:YES), the restoration control circuit 27 supplies to the digital PLL 23 a request for performing another bit synchronization (S25).

Then, the restoration control circuit 27 determines whether or not the data-reading operation with the current logical data block 7 is finished (S26). When no (S26:NO), the routine goes back to Step 21, to continue the restoration operation for correcting the bit de-synchronization.

When the above data block reading operation is finished (S26:YES), the bit de-synchronization restoration procedure comes to an end.

At Step 23, when the positional information contains an error (S23:NO), the bit detection circuit 31 recognizes the bit input condition (S27).

Then, the bit detection circuit 31 determines whether or not the recognition of the bit input condition has been properly carries out (S28).

When the above recognition has been properly performed (S28:YES), the bit detection circuit 31 issues a pseudo-burst pattern, and supplies to the PLL 23 a request for performing another bit synchronization (S29). Then, the routines goes to Step 26.

When the recognition of the bit input condition has not been properly performed (S28:NO), the routine goes back to Step 22.

Figure 11:
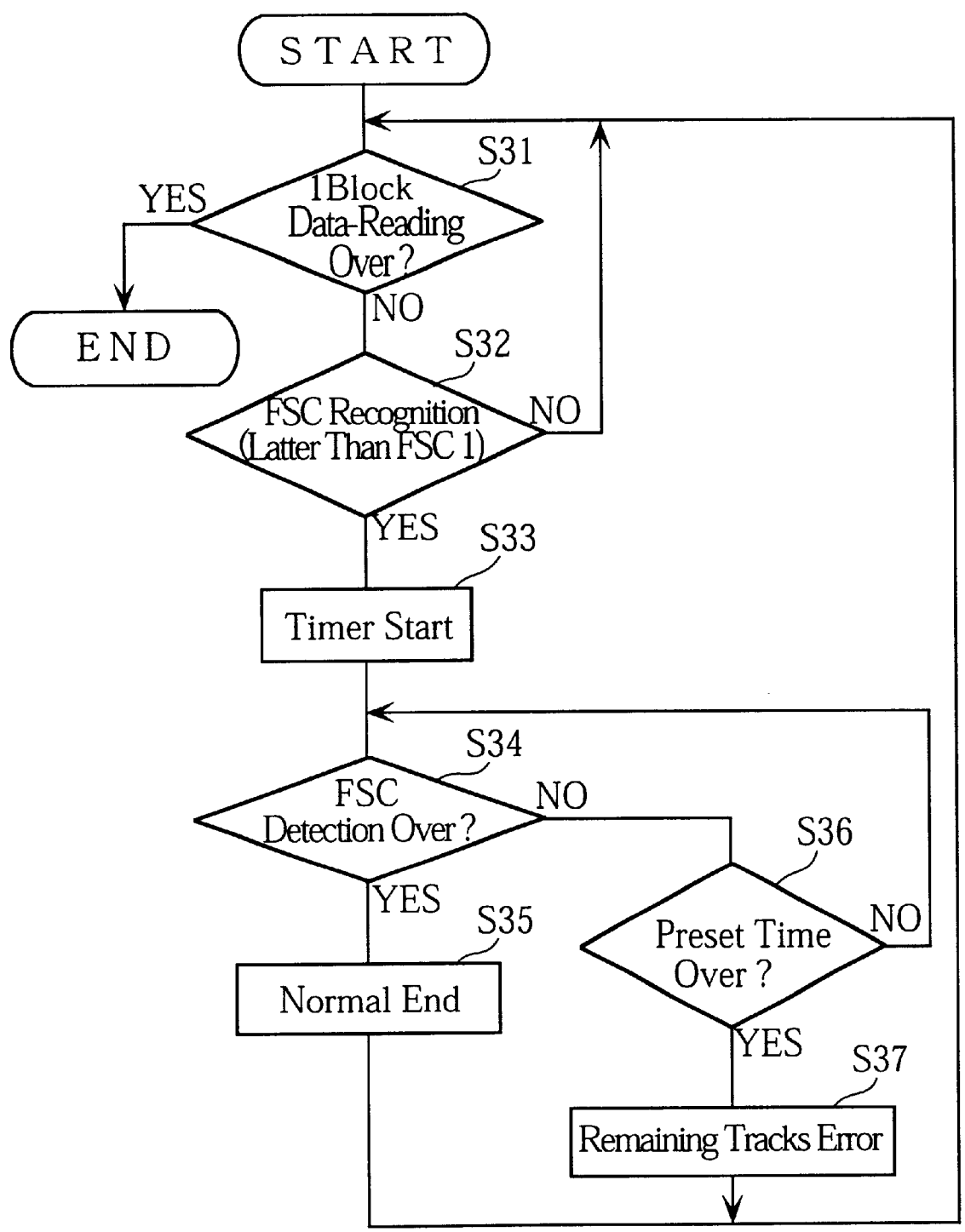
FIG. 11 is a flowchart illustrating how the error track detection proceeds.
Figure 12:
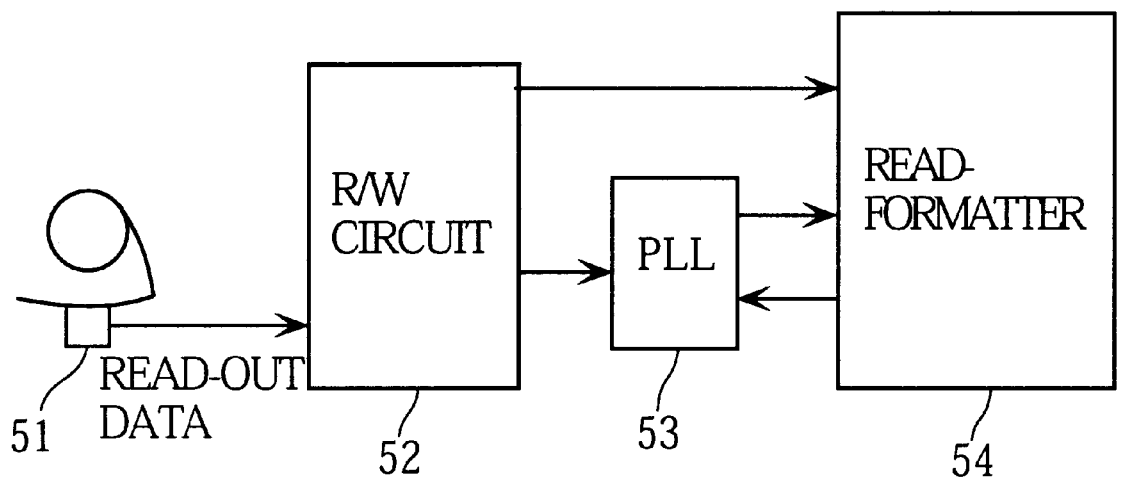
FIG. 12 is a block diagram showing the principal components of a conventional magnetic tape unit.

Next, reference is made to FIG. 11 to describe the error track detecting procedure by the magnetic tape unit.

First, the error track detection circuit 28 determines whether or not the data-reading operation with one logical data block 7 is finished (S31).

When no (S31:NO), the error track detection circuit 28 determines whether or not FSCs (excluding FSC1s) have been recognized (S32).

When such recognition is made (S32:YES), the error track detection circuit 28 starts a timer (S33).

Then, the error track detection circuit 28 determines whether or not FSCs have been detected with respect to all of the tracks (S34).

When FSCs have been detected with respect to all the tracks (S34:YES), the error track detection circuit 28 determines that the procedure is properly finished (S35), in other words, that no error track has been detected. Thus, the routine goes back to Step 31.

When FSCs have not been detected with respect to all the tracks (S34:NO), the error track detection circuit 28 determines whether or not the period of time indicated by the timer is no shorter than the predetermined reference period (S36).

When the above indicated time period is equal or greater than the reference period (S36:YES), the error track detection circuit 28 regards a particular track as an error track (S37) if no FSC has been detected with respect to that track. Then, the routine goes back to Step 31.

At Step 36, when the above indicated time period is shorter than the reference period (S36:NO), the routine goes back to Step 34. The predetermined reference period may be 160 (bit-cell), which is generally equal to $(220/15)\times(16-5)$, where "220" is a maximum distortion setting (bit-cell), "16" is the total track number, and "5" is an FSC recognition threshold.

At Step 32, when the FSC2 and the subsequent FSCs are not recognized (S32:NO), the routine goes back to Step 31.

At Step 31, when the data-reading operation with the logical data block 7 is finished (S31:YES), the error track detecting operation comes to an end.

According to the present invention, the speed variation detection circuit 26 rapidly and accurately determines, by majority rule, whether or not the transmission speed of readout data is normal. Thus, it is possible to readily detect that the PLL 23 fails to perform the bit synchronization properly. Further, upon detecting the failure of the bit synchronization, the restoration control circuit 27 can make a swift restoration utilizing the re-synchronization burst sections 14. Even if this restoration fails, the bit detection circuit 31 can make a restoration in a different manner utilizing pseudo-data. Still further, even if the speed variation detection circuit 26 fails to detect an error track, the error track detection circuit 28 can do it in place of the circuit 26.

In accordance with a first aspect of the above-described idea, there may be provided a magnetic tape unit which includes a magnetic head, a PLL and a desynchronized track detector. The magnetic head is arranged to simultaneously read out data from a plurality of tracks on a magnetic tape. The PLL is arranged to subject to bit synchronization every piece of data read out from the respective tracks on the tape.

The desynchronized track detector is arranged to compare the transmission speed of data read out from a track with the transmission speed of data read out from another track on the tape, so that a desynchronized track will be detected.

Further, the desynchronized track detector is arranged compare the transmission speed of data read out from any one of the tracks with the transmission speed of data read out from the bit-synchronized tracks, so that a bit-desynchronized track will be detected by majority rule.

In accordance with a second aspect of the above-described idea, there may be provided a magnetic tape unit which includes a magnetic head, a PLL and a desynchronized track detector. The magnetic head is arranged to simultaneously read out data from a plurality of tracks on a magnetic tape. The PLL is arranged to subject to bit synchronization every piece of data read out from the respective tracks on the tape. The desynchronized track detector is arranged to compare the transmission speed of data read out from a track with the transmission speed of data read out from another track on the tape, so that a desynchronized track will be detected.

Differing from the above unit of the first aspect, The desynchronized track detector may be arranged to compare the transmission speed of data read out from any one of the tracks with the transmission speeds of data read out from the other tracks. Then, the resulting differences in transmission speed are compared with a certain threshold which is calculated based on differences in transmission speed with respect to pieces of data read out from a plurality of tracks.

Then, based on the comparison with the threshold, it is determined, by majority rule, whether or not the bit synchronization has been properly performed.

In accordance with a third aspect of the above-described idea, there may be provided a magnetic tape unit which includes a magnetic tape, a magnetic head, a PLL, a desynchronized track detector, a burst pattern detector and a bit synchronization instructor. The magnetic tape is provided with a plurality of tracks each of which includes unit data regions. Each of these unit data regions is provided with a burst pattern area for performing bit-synchronization. The magnetic head is designed to simultaneously read out data from the tracks on the tape. The PLL is arranged to subject to bit synchronization every piece of data read out from the respective tracks on the tape. The desynchronized track detector detects a bit-desynchronized track by comparing the data transmission speeds of the respective tracks. The burst pattern detector detects the above-mentioned burst pattern areas based on the read-out data from the respective tracks. The bit synchronization instructor supplies an instruction to cause the PLL to subject a bit-desynchronized track to bit synchronization when a burst pattern area is detected by the burst pattern detector. Further, in controlling a bit-desynchronized track, the bit synchronization instructor utilizes data which is obtained by the burst pattern detector from a bit-synchronized track adjacent to the bit-desynchronized track.

The present invention being thus described, it is obvious that the same may be varied in many ways. Such variations are not to be regarded as a departure from the spirit and scope of the present invention, and all such modifications as would be obvious to those skilled in the art are intended to be included within the scope of the following claims.

What is claimed is:

1. A magnetic tape unit comprising:

a magnetic tape provided with a plurality of tracks;

a magnetic head for simultaneously reading out data from the tracks on the tape;

a phase-locked loop for performing bit synchronization of data read out from each of the tracks on the tape; and a detector arranged for detecting a desynchronized track by comparing a transmission speed of data read out from each track of the tape with transmission speeds of data read out from other tracks of the tape.

2. The magnetic tape unit according to claim 1, wherein each of the tracks of the tape includes a unit data region flanked by synchronization codes to perform byte synchronization, the detector comparing the transmission speeds with each other during a period for reading out data from the unit data region.

3. The magnetic tape unit according to claim 1, wherein the detector compares any one of the transmission speeds with remaining transmission speeds, so that failure in bit synchronization is determined by majority rule.

4. The magnetic tape unit according to claim 1, further comprising a timer and a desynchronized track recognizer, wherein the timer starts measuring time when a first piece of particular data is detected in the read-out data from a predetermined number of tracks, the desynchronized track recognizer regarding a particular track as a bit-desynchronized track when a second piece of particular data is not detected in the read-out data from said particular track within a predetermined time period after the timer is started.

5. The magnetic tape unit according to claim 1, wherein each of the tracks of the tape includes burst pattern regions for performing bit synchronization.

6. The magnetic tape unit according to claim 5, further comprising a burst pattern region detector for detecting the burst pattern regions of each track based on the read-out data from said each track.

7. The magnetic tape unit according to claim 6, further comprising a bit synchronization instructor for supplying an instruction to cause the phaselocked loop to perform bit synchronization with respect to a desynchronized track when a burst pattern region is detected by the burst pattern region detector.

8. The magnetic tape unit according to claim 1, further comprising a pseudo-data generator arranged to supply to the phase-locked loop a piece of pseudo-data for performing bit synchronization with respect to a desynchronized track.

\* \* \* \* \*